Patented May 29, 1923.

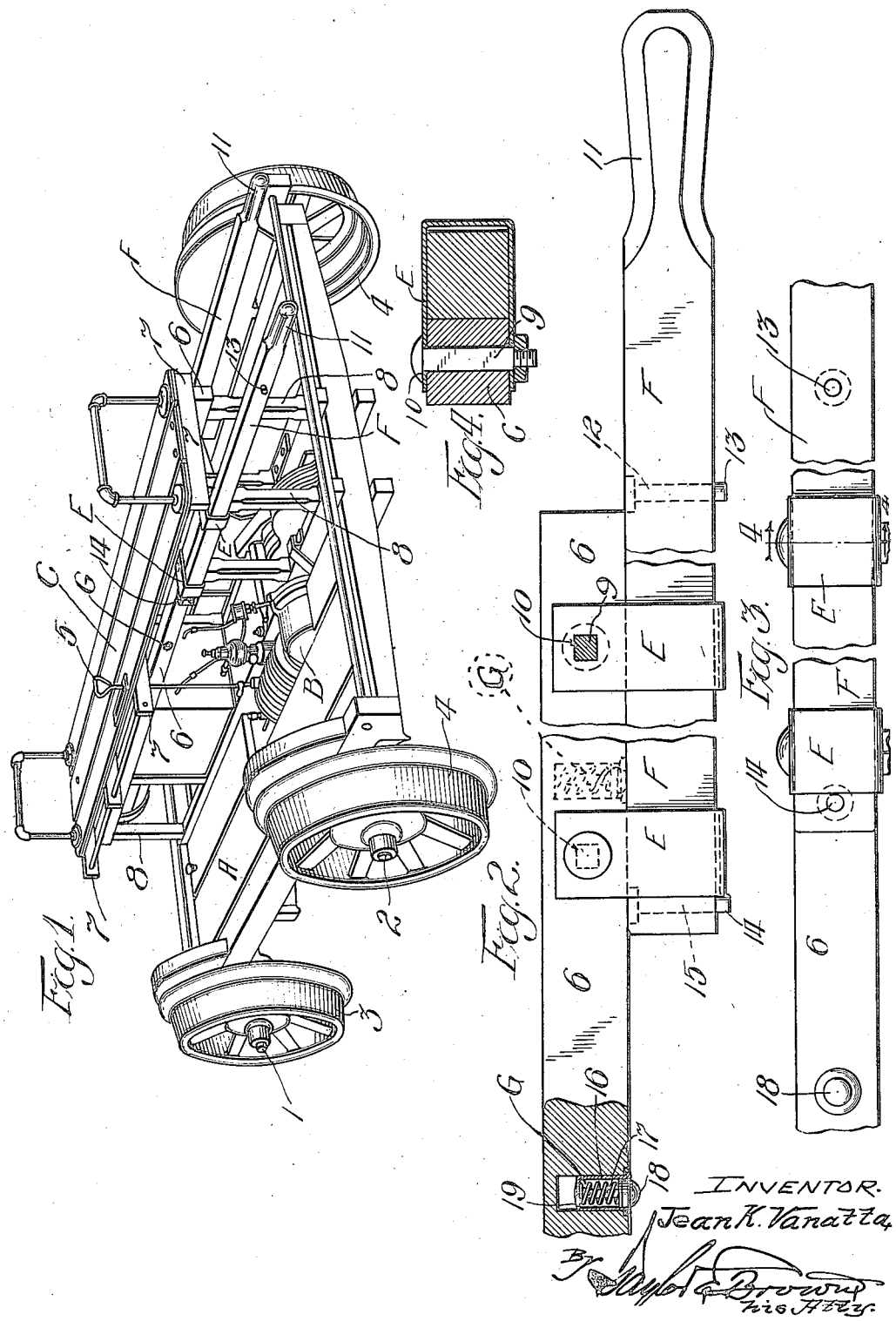

1,456,659

UNITED STATES PATENT OFFICE.

JEAN K. VANATTA, OF CHICAGO, ILLINOIS, ASSIGNOR TO MUDGE & COMPANY, OF CHICAGO, ILLINOIS, A CORPORATION OF ILLINOIS.

MOTOR CAR.

Application filed February 23, 1923. Serial No. 620,573.

*To all whom it may concern:*

Be it known that I, JEAN K. VANATTA, a citizen of the United States, residing at Chicago, in the county of Cook and State of Illinois, have invented certain new and useful Improvements in Motor Cars, of which the following is a specification, reference being had to the accompanying drawings and to the reference characters marked thereon, which form a part of this specification.

This invention relates to motor cars used for track inspection on railways of the class illustrated in my U. S. Letters Patent No. 1,285,847, dated November 26th, 1918, and more specifically to means whereby the car may be more easily placed upon and removed from the railway tracks, by the operator.

Cars of this class are usually heavy. Their construction and design is such as to make it very awkward and troublesome for a person to position the car upon the track or to remove it therefrom without the assistance of another person. Very frequently cars of this class are required for use by one person when there is no other person at hand to assist him, making it difficult for him to manipulate the car, and requiring an undue expenditure of time and effort for the purpose.

The object of the present invention is to provide cars of this class with extension arms, by the use of which the difficulties above referred to will be obviated. The invention consists in the devices and combinations of devices illustrated, described and pointed out in the appended claims.

In the accompanying drawings:

Fig. 1 is a perspective view of a car of the class referred to, in which the present invention is incorporated.

Fig. 2 is an enlarged, detailed, plan view, looking upon one of the extension arms and the side rail to which it is movably attached, and showing in sectional view a friction locking device for the arm.

Fig. 3 is a side view, also enlarged, showing stop pins on the arm.

Fig. 4 is a sectional view showing the means for securing the arm holding clip to the side rail, the section being taken in the plane of the dotted line 4—4 of Fig. 3.

The car illustrated need not be described in detail, reference being made for such details to my said former Patent, No. 1,285,- 847. The car comprises a platform A mounted upon front and rear axles 1 and 2, respectively, which carry supporting wheels 3 and 4. The platform is also provided with a motor or power unit, indicated as a whole at B, operatively connected to rotate the rear axle 2, and controlled by the operating lever 5. The power unit B, it will be noticed, is preferably positioned along the central, longitudinal line of the platform A and over or approximately close to the rear axle 2.

The operator's seat C is raised above the platform and extends longitudinally of the car from rear to front, as shown. The seat C is supported upon a frame comprising parallel, longitudinally arranged side rails 6, 6, and a plurality of transverse connecting bars 7, 7. This frame, of the side rails 6 and bars 7, is supported upon posts 8, 8, which extend vertically up from the platform A.

Beneath the side margins of the seat C and secured to the side rails 6, on each side, are outwardly extending metal guide clips E. These clips are, preferably, U-shaped and are secured at their free ends to the side rails 6 preferably by bolts 9 passing through said rails and through openings 10 in the clips. Two or more clips thus positioned, form aligned guideways and bearings on each side bar 6, for a movable or slidable member F, i. e. a wooden bar having its rear end shaped to form a handle 11.

The movable member F is of a cross-section conformable to the bearing surface of the inside of the clip E; in this instance, square; but obviously, it may be round or other shape, so long as it may be supported by and freely slide back and forth through the clips E.

To limit the movement of the bar F in one direction, a pin or bolt 12 is passed through the bar with its end 13 projecting somewhat beyond the outside face of the bar, and so positioned with respect to the bar as to contact with the rear edge of the clip E when the bar F is in the extended position, and the end 14 of a similar bolt 15 will contact with the forward edge of one of the other clips E when the arm F is in its retracted position,—the edges of the clips acting as abutting shoulders for the projecting stops 13 and 14 on the handle bar F. More than one of said stop bolts may be employed, if desired.

In order to hold the handle bar members F, F, in their retracted position, I employ any suitable mechanism which will exert a friction pressure sufficient for the purpose, such as a flat spring, a spring-pressed bolt, or the like. In the drawing, such a device is illustrated as a whole at G, and consists of a tubular open end shell 16, set into the side rail, its open end margin being flush with the outside surface of the rail. Within this shell 16 is a headed spring-pressed bolt 17, the rounded or slightly conical end 18 of which will normally project beyond the said outside surface of the side rail E, and in the path of the handle bar member F. When the latter is in the normal position, said end 18 will press against the inner surface of the handle bar member F and force the latter against the clips E, thus frictionally locking the handle bar member against displacement or longitudinal movement while the car is in use. To extend the handle bar member F, the operator simply grasps the hand-hold 11 and pulls with sufficient force to overcome the frictional pressure of the spring pressed bolt 17, the spring 19 being sufficiently light to yield to the operator's movement of the handle bar F and yet be sufficiently heavy to give the desired frictional locking pressure against accidental movement of the bar F through the clips E, E.

When the handle bar F is pushed in, i. e. towards the car, its end will first contact with the bolt head 18, but the continued inward movement will cause the member to ride over the rounded end 18, and press the latter into the shell 16, thereby placing the spring 19 under tension. Thus the handle bar members are automatically locked and unlocked by the act of sliding them in or out.

It will be manifest that, because the power unit B is positioned at or near the rear axle 2 and because of the leverage afforded by the handle bar members when extended, the front or lighter end of the car will be moved with the very minimum of exertion by a single person. It is also true, for the same reasons, that the operator will find it comparatively easy to lift the rear of the car from the rails, since, in this case, the leverage will extend from the handles 11 of the bars F, F, to the front wheels 3.

The friction unit G is shown, in Fig. 1, for convenience, positioned in front of the front end of the handle bars when the latter are in the extended position, but it is manifest that this unit may be positioned in rear of its illustrated location, as shown in dotted lines in Fig. 2, so as to at all times contact with the inside surface of the handle bar.

I claim as my invention:

1. In a track inspection motor car of the class described, a raised seat frame comprising parallel side rails and a plurality of cross bars, vertical supporting standards between the car platform and the seat frame, a handle member at the side of each side rail capable of longitudinal movement relative thereto, and means for controlling the extent of movement of said member.

2. In a motor car of the class described, a raised seat frame extending longitudinally of the car and comprising a pair of parallel side rails and a plurality of cross bars, supporting standards extending vertically between the car platform and the seat frame, a pair of handle bar members, one for each side rail, means projecting laterally from the side rail for supporting the handle bar member and permitting of its longitudinal movement relative to the side bar, and means for controlling the extent of said movement.

3. In a motor car of the class described, a raised seat frame extending longitudinally of the car and comprising a pair of parallel side rails and a plurality of cross bars, supporting standards extending vertically between the car platform and the seat frame, a pair of handle bar members, one for each side rail, means projecting laterally from the side rail for supporting the handle bar member and permitting of its longitudinal movement relative to the side bar, and means for controlling the extent of said movement, said projecting means including clips.

4. In a motor car of the class described, a raised seat frame extending longitudinally of the car and comprising a pair of parallel side rails and a plurality of cross bars, supporting standards extending vertically between the car platform and the seat frame, a pair of handle bar members, one for each side rail, means projecting laterally from the side rail for supporting the handle bar member and permitting of its longitudinal movement relative to the side bar, and means for controlling the extent of said movement, said controlling means including a projecting pin on the slidable member.

5. In a track inspection motor car of the class described, a raised seat frame comprising parallel side rails and a plurality of cross bars, vertical supporting standards between the car platform and the seat frame, a handle member at the side of each side rail capable of longitudinal movement relative thereto, means for controlling the extent of movement of said member, and means for frictionally holding the handle bar members in their retracted position.

6. In a motor car of the class described, a raised seat frame extending longitudinally of the car and comprising a pair of parallel side rails and a plurality of cross bars, supporting standards extending vertically between the car platform and the seat frame, a pair of handle bar members, one for each side rail, means projecting laterally from the side rail for supporting the handle bar member and permitting of its longitudinal movement relative to the side bar, means for controlling the extent of said movement, and means for holding the handle bar member frictionally in its retracted position.

7. In a motor car of the class described, a raised seat frame extending longitudinally of the car and comprising a pair of parallel side rails and a plurality of cross bars, supporting standards extending vertically between the car platform and the seat frame, a pair of handle bar members, one for each side rail, means projecting laterally from the side rail for supporting the handle bar member and permitting of its longitudinal movement relative to the side bar, means for controlling the extent of said movement, and means for holding the handle bar member frictionally in its retracted position, the projecting means including clips and said controlling means including a pin projecting from the slidable bar.

In testimony that I claim the foregoing as my invention, I affix my signature, in the presence of two witnesses, this 21st day of February, 1923.

JEAN K. VANATTA.

Witnesses:
TAYLOR C. BROWN,
B. L. MACGREGOR.